(12) United States Patent
Harrison et al.

(10) Patent No.: US 7,971,478 B2
(45) Date of Patent: Jul. 5, 2011

(54) WIND SENSOR

(76) Inventors: Harvey Harrison, Andover, MA (US);
Richard Paskowsky, Andover, MA (US)

( * ) Notice: Subject to any disclaimer, the term of this patent is extended or adjusted under 35 U.S.C. 154(b) by 76 days.

(21) Appl. No.: 12/572,718

(22) Filed: Oct. 2, 2009

(65) Prior Publication Data

US 2011/0079072 A1    Apr. 7, 2011

(51) Int. Cl.
*G01P 5/00* (2006.01)
(52) U.S. Cl. .................................................. 73/170.12
(58) Field of Classification Search .................. None
See application file for complete search history.

(56) References Cited

U.S. PATENT DOCUMENTS

| | | | | |
|---|---|---|---|---|
| 3,352,154 | A | | 11/1967 | Djorup |
| 3,706,938 | A | * | 12/1972 | Petriw ........................... 324/459 |
| 3,713,336 | A | * | 1/1973 | Bernstein et al. ........... 73/170.11 |
| 3,991,624 | A | * | 11/1976 | Davies ........................ 73/170.12 |
| 4,152,933 | A | * | 5/1979 | Woodhouse ............... 73/170.07 |
| 4,648,271 | A | * | 3/1987 | Woolf ......................... 73/204.27 |
| 5,020,214 | A | | 6/1991 | Tsuruoka et al. |
| 5,218,865 | A | | 6/1993 | Djorup |
| 5,357,795 | A | | 10/1994 | Djorup |
| 5,367,906 | A | | 11/1994 | Tsuruoka et al. |
| 6,279,393 | B1 | * | 8/2001 | McLaughlin ............... 73/170.14 |
| 6,564,652 | B1 | | 5/2003 | Zoccola, Jr. |
| 6,705,158 | B1 | * | 3/2004 | Louden ....................... 73/170.12 |
| 7,093,483 | B2 | * | 8/2006 | Corey et al. ................. 73/170.14 |
| 7,140,263 | B2 | | 11/2006 | Beversdorf |
| 2005/0005695 | A1 | * | 1/2005 | Corey et al. ................. 73/170.14 |
| 2005/0150310 | A1 | | 7/2005 | Beversdorf |

FOREIGN PATENT DOCUMENTS

FR        2800876 A1 *   5/2001

OTHER PUBLICATIONS

C. Norberg, "Laboration 2b: Hot Wire Anemometry", MMV211 Fluid Mechanics, Feb. 13, 2008, pp. 1-13, Department of Energy Sciences, Lund Institute of Technology, Lund, Sweeden.
J.E. Romano, et al, "Cross-Wire Probe for Hot-Wire Anemometer", Technical Memorandum No. 5, Sep. 30, 1953, Office of Naval Research, Department of the Navy, University of Illinois, Urbana, Illinois.
L.J.S. Bradbury, "The Pulsed Wire Anemometer: Review and Further Developments", Journal of the Brazilian Society of Mechanical Sciences, 2000, pp. 1-20, vol. 22, n.1, Journal of the Brazilian Society of Mechanical Sciences, Rio de Janeiro, Brazil.

\* cited by examiner

*Primary Examiner* — Andre J Allen
(74) *Attorney, Agent, or Firm* — Mills & Onello, LLP; David M. Mello

(57) ABSTRACT

A wind sensor includes first and second elements in an orthogonal axis arrangement and a calibration data array comprising first calibration data associated with the first element and second calibration array data associated with second element. An anemometric processor determines a wind speed (S) and direction (W) for an airflow received by the first and second elements using a first electrical parameter associated with the first element and the first calibration array data and a second electrical parameter associated with the second element and the second calibration array data. A wind sensing probe can have a pair of wind sensing elements, wherein each element has a core formed of a low specific heat, low density, high temperature plastic polymer, with two metal leads extending from the ends of core. A wind sensing element can include a fine Nickel alloy coil wound around an aforementioned core.

20 Claims, 5 Drawing Sheets

| Record | S | W | $V_X$ | $SIGN_X$ | $V_Y$ | $SIGN_Y$ |
|---|---|---|---|---|---|---|
| 001 | 5 | 0 | 3.62 | 0 | 2.05 | 1 |
| 002 | 5 | 15 | 3.55 | 0 | 2.67 | 1 |
| 003 | 5 | 30 | 3.43 | 0 | 3.06 | 1 |
| 004 | 5 | 45 | 3.25 | 0 | 3.34 | 1 |
| 005 | 5 | 60 | 2.84 | 0 | 3.52 | 1 |
| 006 | 5 | 75 | 2.38 | 0 | 3.59 | 1 |
| 007 | 5 | 90 | 2.12 | 1 | 3.61 | 1 |
| 008 | 5 | 105 | 2.57 | 1 | 3.51 | 1 |
| | | | | | | |
| | | | | | | |

WIND SENSOR

FIELD OF INTEREST

The present inventive concepts relate to the field of systems and methods for sensing wind speed and direction, and more particularly to the field of wind sensors.

BACKGROUND

Wind sensors have a wide range of practical applications. For example, wind sensors are common at weather stations, airports, and other locations for sensing wind speed and direction. At an airport, as an example, this information is particularly useful in guiding aircraft with respect to take-offs and landings.

An anemometer is one device that is used for measuring wind speed. There are many types of anemometers, such as cup, windmill, and hot-wire anemometers.

In a hot-wire anemometer, a very thin element (having a cross-section on the order of several micrometers) is heated up to a temperature above the ambient. Air flowing past the element has a cooling effect on the element. Since the electrical resistance of most metals is dependent upon the temperature of the metal (tungsten is a popular choice for elements), a mathematical relationship can be obtained between the resistance of the element and the flow velocity. This relationship is well known.

Several ways of implementing a hot-wire anemometer exist, and hot-wire anemometers can be further classified as CCA (Constant-Current Anemometer), CVA (Constant-Voltage Anemometer) and CTA (Constant-Temperature Anemometer). The voltage output from these anemometers is, thus, the result of a circuit within the device trying to maintain constant the specific variable (current, voltage or temperature).

The advantages of thermal anemometry include high accuracy, an easily-automated collection procedure, and a high frequency response allowing measurement of turbulent flows. The use of electrically self-heated resistors, hot wires, and hot films as thermal anemometer transducers is well known in the prior art. These elements, when maintained at constant temperature rise above the ambient, can indicate with precision the direction and magnitude of airflow. This is accomplished electrically by using a servo loop, which senses the error between the voltage divider involving the sensing element and the voltage divider involving a thermistor with a similar temperature coefficient of resistance.

By compensating for ambient temperature changes, the elements are maintained at constant temperature rise above the ambient. Any airflow change across the sensing element requires a change in current through the sensor element to keep it at a constant temperature rise. Platinum wire or depositions of Platinum have been commonly used because of its stability at high temperatures; Platinum has a high temperature coefficient. Since a high temperature coefficient of resistance is required, the material supporting the Platinum needs to have a good high temperature coefficient of resistance as well. Combining the cost of Platinum, the support material, and the sophisticated processes in manufacturing these elements, the costs for producing, using, and maintaining thermal anemometers has been prohibitively high. Combining these considerations with the data processing requirements of such anemometers has made use in the commercial, industrial, and military marketplaces largely impractical.

SUMMARY

In accordance with aspects of the present invention, the measurement of wind speed and direction by thermal anemometry is accomplished with high accuracy and at a relatively low cost. For instance, low cost materials can be used with a precision manufacturing process so that wind sensing elements can be built at a significantly lower cost. In accordance with another aspect of the invention, a wind sensor utilizes a calibration array of data in conjunction with linear interpolation to achieve fast and accurate determinations of wind speed and direction. With a combination of low cost microcomputer technology, a pair of low-cost wind sensing elements, an appropriate thermistor and the improved calibration array and processing, a low cost wind sensor system can be achieved that quickly converges on an accurate wind speed and direction.

In accordance with one aspect of the present disclosure, provided is a wind sensor. The wind sensor includes a first element and a second orthogonal element. A storage media has a calibration array comprising first calibration data associated with the first element and second calibration array data associated with second element. And an anemometric processor determines a wind speed (S) and direction (W) for an airflow received by the first and second elements using a change in a first electrical parameter associated with the first element and the first calibration array data and a change in a second electrical parameter associated with the second element and the second calibration array data.

The first element can define an X-axis in an X plane and the first calibration data can be X plane data. And the second element can define a Y-axis in a Y plane and the second calibration data can be Y plane data.

The X plane data can include a plurality of first voltage calibration points $V_X(S_X,Q_X)$ in the X plane and the Y plane data can include a plurality of second voltage calibration points $V_Y(S_Y,Q_Y)$ in the Y plane, where $Q_X$ is a set of incremental angles with respect to the X plane and $Q_Y$ is a set of incremental angles with respect to the Y plane. Likewise, S is a set of incremental wind speeds.

The first electrical parameter associated with the first element can be a voltage $V_X$. And the second electrical parameter associated with the second element can be a voltage $V_Y$.

A plus or minus sign associated with the incoming airflow for the first element can be a $sign_X$ and a plus or minus sign associated with the incoming airflow for the second element can be a $sign_Y$. And the anemometric processor can be configured to determine a quadrant of the airflow in an X-Y coordinate system from the $sign_X$ and the $sign_Y$ and to find wind speed (S) and direction (W) using X plane data and Y plane data in the quadrant.

The anemometric processor can be configured to determine the wind speed (S) and direction (W) for the airflow by performing linear interpolation to find the common S and W values for measured value $V_X(S_X,Q_X \approx W)$ in the X plane using the X plane data in the quadrant and measured value $V_Y(S_Y, Q_Y \approx W)$ in the Y plane using the Y plane data in the quadrant.

In the above case, $Q_X \approx W$ and $Q_Y \approx W$ when the anemometric processor determines a difference between $Q_X$ and $Q_Y$ to be within an error threshold.

The anemometric processor can iteratively perform linear interpolation using four points in the X plane and four points in the Y plane for one or more of the iteratively performed linear interpolations.

The anemometric processor can be configured to determine the wind direction (W) from $Q_X$ and $Q_Y$, when $Q_X$ and $Q_Y$ are within the error threshold.

The anemometric processor can be configured to determine the wind speed (S) from a speed associated with $Q_X$ and a speed associated with $Q_Y$, when $Q_X$ and $Q_Y$ are within the error threshold.

In accordance with another aspect of the invention, provided is a method of determining wind speed (S) and direction (W) for an airflow received by first and second elements of a cross-wire wind sensor. The method includes providing a calibration data array in a storage media accessible by an anemometric processor, the calibration array comprising first calibration data associated with the first element and second calibration array data associated with second element. The method also includes calculating the wind speed (S) and direction (W) for the airflow using a first electrical parameter associated with the first element and the first calibration array data and a second electrical parameter associated with the second element and the second calibration array data.

The first element can define an X-axis in an X plane and the first calibration data can be X plane data. The second element can define a Y-axis in a Y plane and the second calibration data can be Y plane data. The X plane data can include a plurality of first voltage calibration points $V_X(S_X,Q_X)$ in the X plane and the Y plane data can include a plurality of second voltage calibration points $V_Y(S_Y,Q_Y)$ in the Y plane, where $Q_X$ is a set of incremental angles with respect to the X plane and $Q_Y$ is a set of incremental angles with respect to the Y plane. S is a set of incremental wind speeds.

The first electrical parameter can be associated with the first element can be a voltage $V_X$ and the change in the second electrical parameter associated with the second element is a voltage $V_Y$. The method can further include, from a direction of the airflow, determining a $sign_X$ associated with first element and a $sign_Y$ associated with the second element, and determining a quadrant of the airflow in an X-Y coordinate system from the $sign_X$ and the $sign_Y$ and finding the wind speed (S) and direction (W) using X plane data and Y plane data in the quadrant.

The method can further include determining the wind speed (S) and direction (W) for the airflow by performing linear interpolation to find $V_X(S_X,Q_X \approx W)$ in the X plane using the X plane data in the quadrant and measured value $V_Y(S_Y, Q_Y \approx W)$ in the Y plane using the Y plane data in the quadrant.

The method can further include $Q_X \approx W$ and $Q_Y \approx W$ when a difference between $Q_X$ and $Q_Y$ is determined to be within an error threshold.

The method can further include using four points in the X plane and four points in the Y plane for one or more of the iteratively performed linear interpolations.

The method can further include determining the wind direction (W) from $Q_X$ and $Q_Y$, when $Q_X$ and $Q_Y$ are within the error threshold.

The method can further include determining the wind speed (S) from a speed associated with $Q_X$ and a speed associated with $Q_Y$, when $Q_X$ and $Q_Y$ are within the error threshold.

In accordance with another aspect of the invention, provided is a method of generating a calibration array for a cross-wire wind sensor. The method includes: providing a storage media coupled to an anemometric processor and a probe having first and second elements in a crossed arrangement; directing at the probe an airflow having a known speed (S) and angle (W); recording a voltage difference across the first element as $V_X$ and a voltage difference across the second element as $V_Y$; recording an airflow direction associated with the first element as $sign_X$ and an airflow direction associated with the second element as $sign_Y$; storing $V_X$, $V_Y$, $sign_X$, and $sign_Y$ in association with the known speed (S) and angle (W); and changing at least one of the known speed (S) and angle (W) and repeating the above steps.

In accordance with another aspect of the invention, provided is a wind sensing probe including a pair of wind sensing elements. Each wind sensing element Includes: a core comprising an ultra-performance plastic polymer; two similar-metal leads extending from different ends of the core; and a Nickel coil wound around the core, with at least about 100 windings per inch.

The wind sensing probe can further include a protective non-corrosive coating covering the coil.

The leads can be coupled to the core with a high temperature epoxy and the coil can be coupled to the leads with a moderate temperature solder.

The wind sensing probe can further include a protective non-corrosive coating covering the coil, the epoxy weld, and the solder.

The wind sensing probe is composed of two wound coils that are connected in series with one coil arranged to be parallel to the other. This dual coil parallel arrangement allows the positive or negative "sign" of the incoming airflow to be determined.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1A:
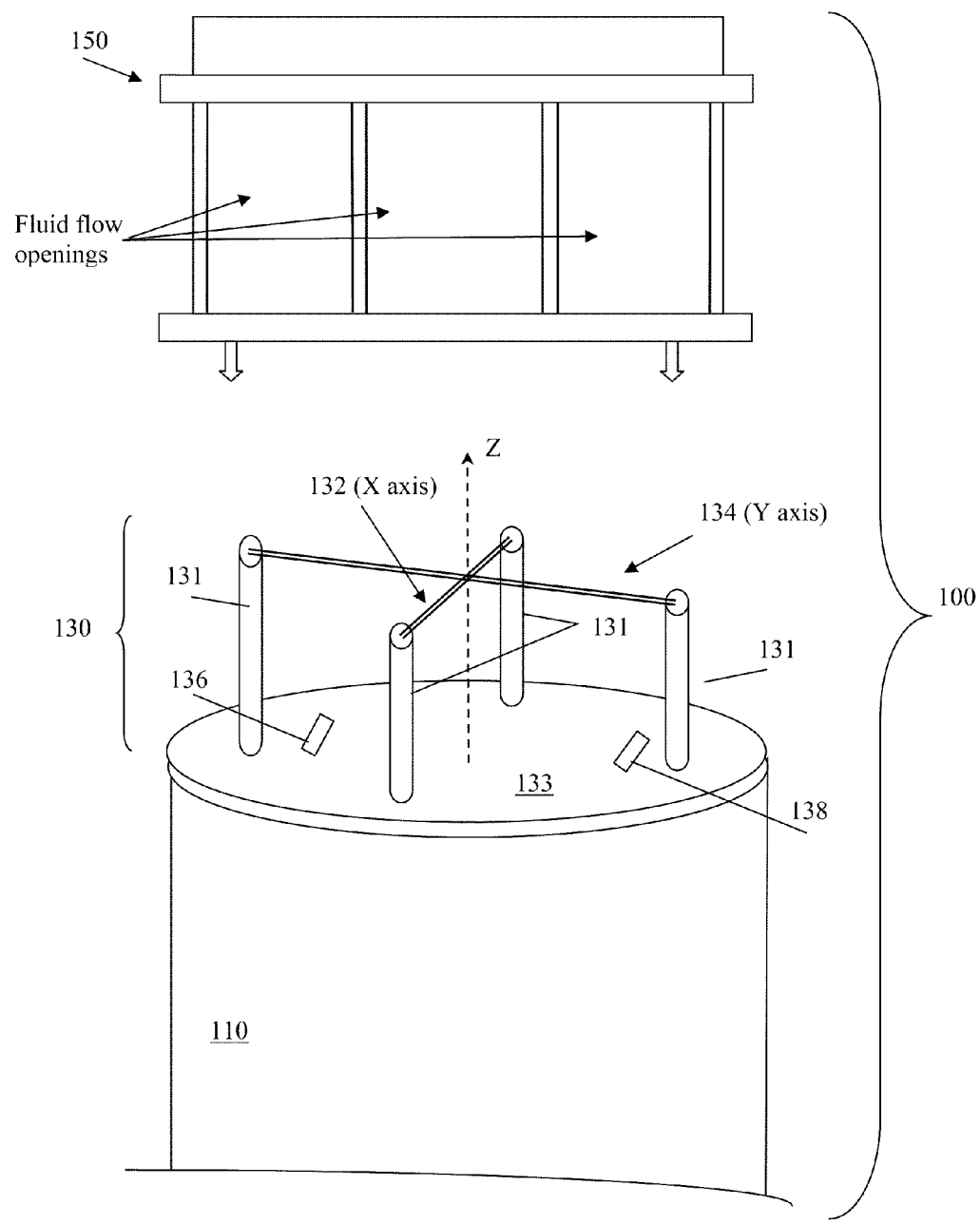
FIG. 1A is a perspective view of a wind sensor in the form of a cross-wire thermal anemometer, in accordance with aspects of the present invention.

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are being used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that the terms X plane and Y plane are being used to describe the various airstream paths that are affecting the X axis element and Y axis element.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

FIG. 1A provides an embodiment of a wind sensor 100, in accordance with aspects of the present invention. The wind sensor 100 takes the form of a cross-wire (or dual-axis) anemometer having two elements in a crossed arrangement. Wind sensor 100 includes a housing 110, a probe assembly 130, and a cover 150. In FIG. 1A, the cover 150 is shown disengaged from the housing 110 for the purposes of illustrating aspects of the probe assembly 130.

In this embodiment, the probe assembly 130 includes two crossed elements, i.e., a first element 132 and a second element 134 that are slightly spaced apart. The first element 132 can be considered to define an X-axis and the second element 134, orthogonal to the first element 132, can be considered to define a Y-axis. A Z-axis can be defined that extends from the crossing point of the X-axis and Y-axis, and perpendicularly to each of the X and Y axes. As will be described below, wind speed (S) and direction (W) can be determined using the X-Y coordinate system. And the wind sensor can be rotated around the (central) Z-axis to collect calibration data, in accordance with the present invention.

Each of elements 132, 134 is supported at its ends by vertical posts 131 mounted to a base 133. First element 132 is part of a first loop that includes a first temperature compensating element 136. And second element 134 is part of a second loop that includes a second temperature compensating element 138.

Figure 2:
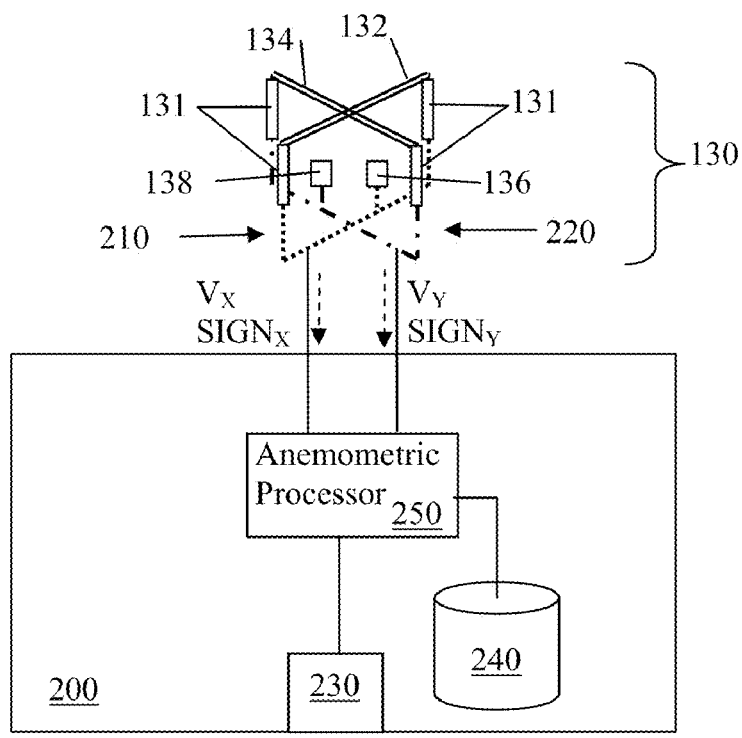
FIG. 2 is diagram of the wind sensor of FIG. 1A, including an embodiment of an anemometric circuit, in accordance with aspects of the present invention.

The probe assembly 130 includes an anemometric circuit that is coupled to the elements 132, 134, see, e.g., FIG. 2. The housing 110 encases the anemometric circuit, and can be made from plastic, PVC pipe, or some other non-corrosive material. Elements 132, 134 and temperature compensating elements 136, 138 extend above housing 110 and are encased by protective cover 150, which enables the flow of wind over the foregoing. Cover 150 can be made of the same materials as housing 110, but could alternatively be made of different materials. These materials are known in the art.

Each of elements 132, 134 includes two elongated coils in a side-by-side parallel arrangement. Each coil is wrapped around a ceramic core material, with leads connecting to posts 131. This physical arrangement is generally known in the art. Platinum, thick film Platinum, and tungsten are considered acceptable coil materials in the art.

Figure 1B:
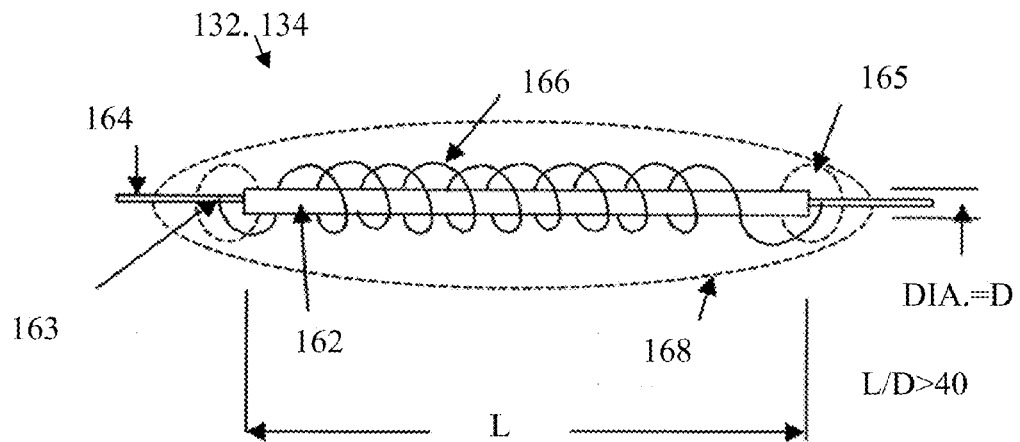
FIG. 1B depicts an embodiment of a wind sensing element, in accordance with aspects of the present invention.

FIG. 1B depicts an embodiment of a wind sensing element in accordance with aspects of the present invention. The wind sensing probe 130 is composed of two wound coils that are connected in series with one coil arranged to be parallel to the other. This dual coil parallel arrangement allows the positive or negative "sign" of the incoming airflow to be determined. Elements 132 and 134 above can take the form of wind sensing element of FIG. 1B. As shown in FIG. 1B, wind sensing elements 132 and 134 need not be formed of expensive Platinum to achieve high quality results, as in prior art systems.

In FIG. 1B, a low specific heat and low density plastic polymer, such as polyetheretherketone (PEEK), is used as a material for a core 162. In this embodiment, the diameter (D) of core 162 is about 0.014 inches and the length (L) is about 1.10 inches. More generally L/D>40. Two metal leads 164 extend from the ends of core 162, which are formed of fine gauge wire. A coil 806 is precision wound around core 162. The coil is formed of Nickel 205 fine gauge wire, e.g., with at least about 100 windings per inch. In the present embodiment, use of Nickel 205 wire, which has a high temperature coefficient of resistance (TCR), for coil 166 achieves results as good as, or better, than expensive Platinum coils, and the like.

The coil-to-lead wire connections 163 are soldered and the core-to-lead wire connections 165 are made using a high temperature epoxy. A coating 168 is made over the coil 166 and core 162. The coating 168 must be made from a high temperature coating that does not corrode metal, such as a Rust-Oleum paint or the like.

FIG. 2 provides a diagram of an embodiment of a simplified anemometric circuit 200, in accordance with aspects of the present invention. In FIG. 2, the first loop is denoted by reference number 210, and includes first element 132 and first temperature compensating element 136. The dotted line indicates a portion of the first loop 210 where other loop elements exist, e.g., in a known bridge configuration used for such loops. The second loop is denoted by reference number 220, and includes second element 134 and second temperature compensating element 138. The dashed line indicates a portion of the second loop 220 where other loop elements exist, e.g., in a known bridge configuration used for such loops.

The current in each of first and second loops 210 and 220 is controlled by its respective temperature compensating element 136 or 138—in an effort to maintain the temperature rise above ambient of each of elements 132, 134 at a known value, sometimes referred to herein as the "preset temperature rise." From the change in current of each control loop caused by a fluid flow, a change in power can be determined for each loop. These electrical parameters of the first loop and the second loop can be used to determine the wind speed (S) and direction (W) of the fluid flow, e.g., an air flow or air stream.

As an example, in the present embodiment the preset temperature rise can be about 100° C. In this embodiment, the temperature compensating elements 136 and 138 include fixed resistors with specific TCR that cause automatic adjustment of current in each of the respective first and second loops 210, 220 to maintain the preset temperature rise in each of the control loops in the presence of an air flow. As a result, like elements 132 and 134, temperature compensating elements 136 and 138 are also exposed to the air flow. Temperature compensating elements 136 and 138 are known in the art, so not discussed in further detail herein.

When air flows over the probe elements 132, 134 and temperature compensating elements 136, 138, a voltage in each loop necessary to keep the elements 132, 134 at the preset temperature rise can be determined. For example, if wind flows over element 132, which lies in the X-axis, a current that flows through element 132 can be determined. Knowing the resistance of element 132 allows determination of the voltage associated with the X-axis required to keep element 132 at the preset temperature. This voltage is referred to as $V_X$. Similarly a voltage across element 134 is determined for the Y-axis, referred to as $V_Y$.

For that same airflow, a wind direction can be determined using loops 210 and 220. A combination of the two coils present in each element enables sign information of an air flow over the elements 132, 134 to be determined. The sign information for each element is relative to the axis on which the element is oriented. Since each element includes two coplanar coils arranged in parallel, when air hits at right angles to the pair of coils, one coil shields the other coil in the pair. The current in the shielding coil will increase significantly to maintain the coil at the constant temperature rise, while the current in the shielded coil should experience very little, if any, change.

In the present embodiment, for each of loops 210 and 220, a sign, e.g., "+" or "−", is determined that is related to wind direction. Assuming element 132 lies on the X-axis and element 134 lies on the Y-axis, and the elements cross at an origin, the sign values place the wind direction in one of four quadrants defined by the X-axis and Y-axis, as the X-Y coordinate system. These are referred to as $sign_X$ and $sign_Y$. For instance, the $1^{st}$ quadrant could be defined as the sign of X being − and the sign of Y being +; the $2^{nd}$ quadrant could be defined as the sign of X being + and the sign of Y being +; the $3^{rd}$ quadrant could be defined as the sign of X being + and the sign of Y being −; and the $4^{th}$ quadrant could be defined as the sign of X being − and the sign of Y being −. As a result, the sign can be represented as a two bit number, one bit representing + or − for the X-axis and the other bit representing + or − for the Y-axis.

The probe assembly 130 passes $V_X$ and $sign_X$ from the first loop 210 and $V_Y$ and $sign_Y$ from the second loop 220 to the anemometric circuit 200. The anemometric circuit 200 includes an anemometric processor 250 that processes $V_X$ and $sign_X$ from the first loop 210 and $V_Y$ and $sign_Y$ from the second loop 220. In a calibration mode, processor 250 uses these electrical parameters of the first and second loops 210, 220 to build a calibration array (or table), which is stored in database 240. In an operational mode, processor 250 uses these electrical parameters and the calibration array to determine the speed (S) and direction (W) of the air flow (or wind), the values of which can be output though an output port or device 230. Output port or device 230 can also be used for reading out data from database 240 and setting calibration parameters.

Figures 3, 4:
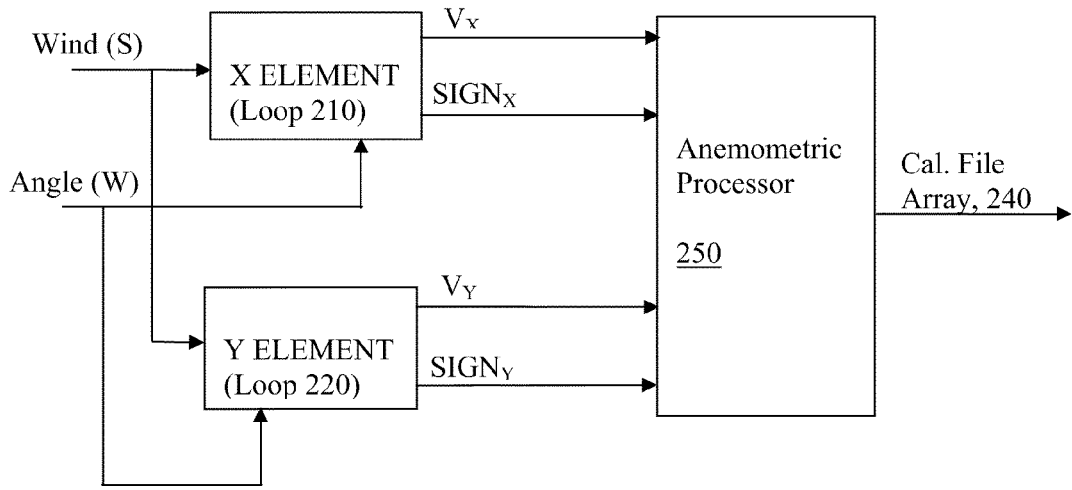
FIG. 3 provides an embodiment of a block diagram useful in describing the building of a calibration array by the anemometric processor in a calibration mode, in accordance with aspects of the present invention.
FIG. 4 is an example embodiment of a partial calibration array or table that can be generated according to the diagram of FIG. 3.

FIG. 3 provides an embodiment of a block diagram useful in describing the building of a calibration array, stored in database 240, by the anemometric processor 250 in the calibration mode. In the present embodiment, the calibration array is generated and stored for subsequent use by the anemometric processor 250 for determining wind speed (S) and direction (W) during operation.

The calibration array is generated by directing an airstream over the probe assembly 130 of the wind sensor 100 in a controlled manner, such that air flows over the orthogonal elements 132, 134 and temperature compensating elements 136, 138. Data in the calibration array is stored relative to one of two planes. Data relating to the first element 132 lies in the X plane and data relating to the second element 134 lies in the Y plane.

As shown in FIG. 3, in this embodiment, wind is directed over the probe assembly 130 at a known angle and speed, where the first element 132 of the first loop 210 can be referred to as an "X element" and the second element 134 of the second loop 220 can be referred to as "Y element." $V_X$ and $sign_X$ are determined for the X element and $V_Y$ and $sign_Y$ are determined for the Y element, as described above with respect to FIG. 2. Anemometric processor 250 stores $V_X$ and $sign_X$ and $V_Y$ and $sign_Y$ for the known angle and speed of the wind directed over probe assembly 130.

The calibration array is built by iteratively changing the wind speed and angle and recording $V_X$ and $sign_X$ and $V_Y$ and $sign_Y$ for each iteration. For example, the wind sensor 100 can be rotated about the central Z-axis in 15 degree increments, from 0 to 360 degrees, with airstreams flowing from 2.5 meters/second (m/s) to 55 m/s, in 5 m/s increments. Each wind speed and angle combination represents one iteration used in forming the calibration array stored in database 240.

FIG. 4 is an example embodiment of a partial calibration array or table 400 that can be generated according to the diagram of FIG. 3. In the partial calibration array 400 of FIG. 4, wind speed in meters per second (m/s) is denoted by "S" and wind angle in degrees is denoted by "W." The values of $V_X$ and $V_Y$ are in volts and the $sign_X$ and $sign_Y$ are indicated by either "1," "0," where 1 can indicate a "+" and 0 can indicate a "−." The calibration array can be a single table or one table of X plane values and another table of Y plane values.

Figure 5:
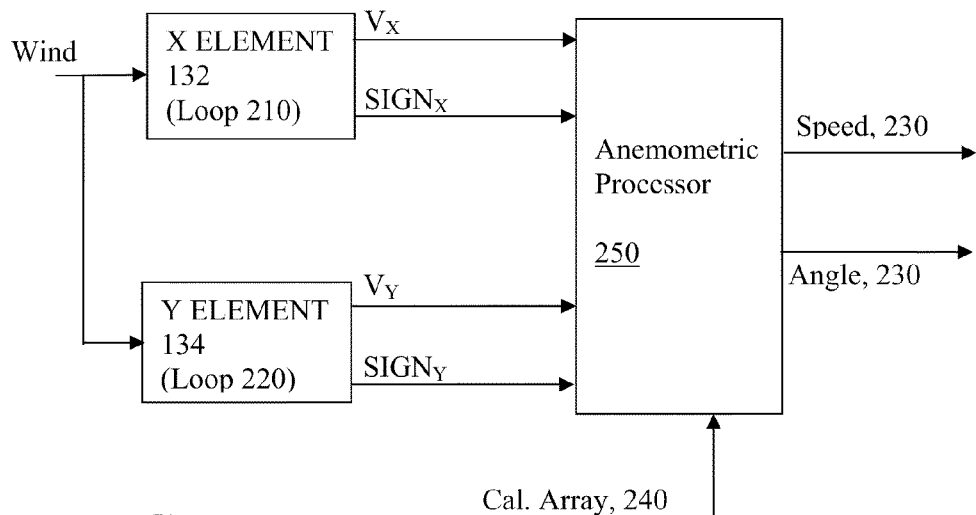
FIG. 5 provides an embodiment of a block diagram useful in describing the operation of the wind sensor of FIG. 1A, in accordance with aspects of the present invention.

FIG. 5 provides an embodiment of a block diagram useful in describing the operation of the wind sensor of FIG. 1A. Here, the anemometric processor 250 operates in an operational mode and, as such, is exposed to wind. The wind speed (S) and direction (W) are not known in advance. The object is for the anemometric processor 250 to determine the speed and direction of the wind using the calibration array 400 in database 240 and $V_X$ and $V_Y$ and $sign_X$ and $sign_Y$ determined for a received airflow.

As described above with respect to FIGS. 2 and 3, the values of $V_X$ and $V_Y$ and $sign_X$ and $sign_Y$ are determined for the wind from the probe assembly 130. $V_X$ and $V_Y$ represent two nonlinear vector components defining the speed and direction of the wind. An equation representing the relationship of wind speed S and direction or angle W to voltage is generally known in the art, and represented in Equations (7) and (8) below.

As shown in FIG. 5, $V_X$ and $V_Y$ and $sign_X$ and $sign_Y$ from the received wind are passed to anemometric processor 250, as sensed from the first and second elements 132, 134, respectively. Anemometric processor 250 determines the wind speed (S) and direction (W) using values in the calibration array 400. The wind speed (S) and direction (W) can then be output via output port or device 230 (shown in FIG. 2).

As noted above, the calibration array 400 includes $V_X$ and $V_Y$ information at different speeds and angles for each of four quadrants. The particular quadrant of data used to determine the wind speed and direction is indicated by the $sign_X$ and $sign_Y$ values for the received wind. For instance, if $sign_X=1$ and $sign_Y=1$ identifies the first quadrant (0-90 degrees) in the calibration array, and the wind flowing over elements 132, 134 produces $sign_X=1$ and $sign_Y=1$, then the wind would be determined to have an angle (or direction) in the range of 0-90 degrees and linear interpolation would be performed using the $V_X$ and $V_Y$ information for the first quadrant.

Linear interpolation for $V_X$ is performed using calibration array data in the X plane and linear interpolation for $V_Y$ is performed using calibration array data in the Y plane. Using the X plane and Y plane data from the calibration array, the anemometric processor 250 performs linear interpolation by iteratively solving two equations with two unknowns to converge on the answer, within the quadrant indicated by the $sign_X$ and $sign_Y$ of the received wind. Using the linear interpolation, the anemometric processor determines a common wind speed S and direction W for the measured $V_X$ and $V_Y$.

Figure 6:
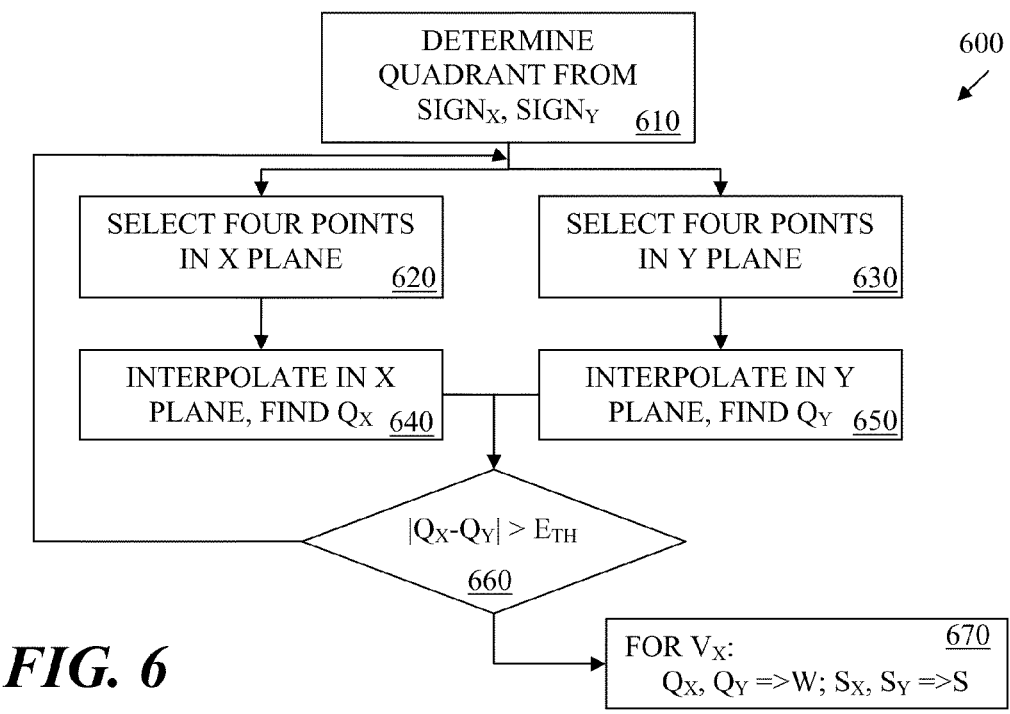
FIG. 6 is a flowchart showing an embodiment of a method of performing calibration by the anemometric processor of FIG. 2, in accordance with aspects of the present invention.

FIG. 6 is a flowchart showing an embodiment of a method 600 of performing linear interpolation by the anemometric processor 250 using a calibration array, as in FIG. 4. In step 610, one of four quadrants is determined from $sign_X$ and $sign_Y$. From the measured $V_X$ and $V_Y$, in steps 620 and 630, four points are chosen in each of the X plane and Y plane, respectively.

In step 640, linear interpolation is performed in the X plane to find the wind direction angle $Q_X$ for a speed $S_X$. And, in step 650, linear interpolation is performed in the Y plane to find the wind direction angle $Q_Y$ for the speed $S_Y$. In step 660, the value for wind direction determined from the X plane, $Q_X$, is compared to the value for wind direction determined from the Y plane, $Q_Y$. When the values of $Q_X$ and $Q_Y$ are equal, or close to equal, the wind speed (S) and direction (W) will be substantially that of the received airflow, $W \approx Q_X$ and $Q_Y$ and $S \approx S_X$ and $S_Y$.

In step 660, the difference between $Q_X$ and $Q_Y$ is compared to a predetermined error threshold, $E_{TH}$. For example, the error threshold $E_{TH}$ could be a percentage, e.g., 3 percent. If the difference exceeds the error threshold $E_{TH}$, the method returns to steps 620 and 630 for another iteration using four new points in each plane, that are converging. If the difference does not exceed the error threshold, the wind speed (S) and direction (W) are indicated (or output), in step 670. Wind direction, W, can be determined from $Q_X$ and $Q_Y$. As examples, W can be determined as either $Q_X$ or $Q_Y$, or an average of the two. And S can be the speed where $Q_X$ and $Q_Y$ are about equal, within $E_{TH}$.

Figure 7:
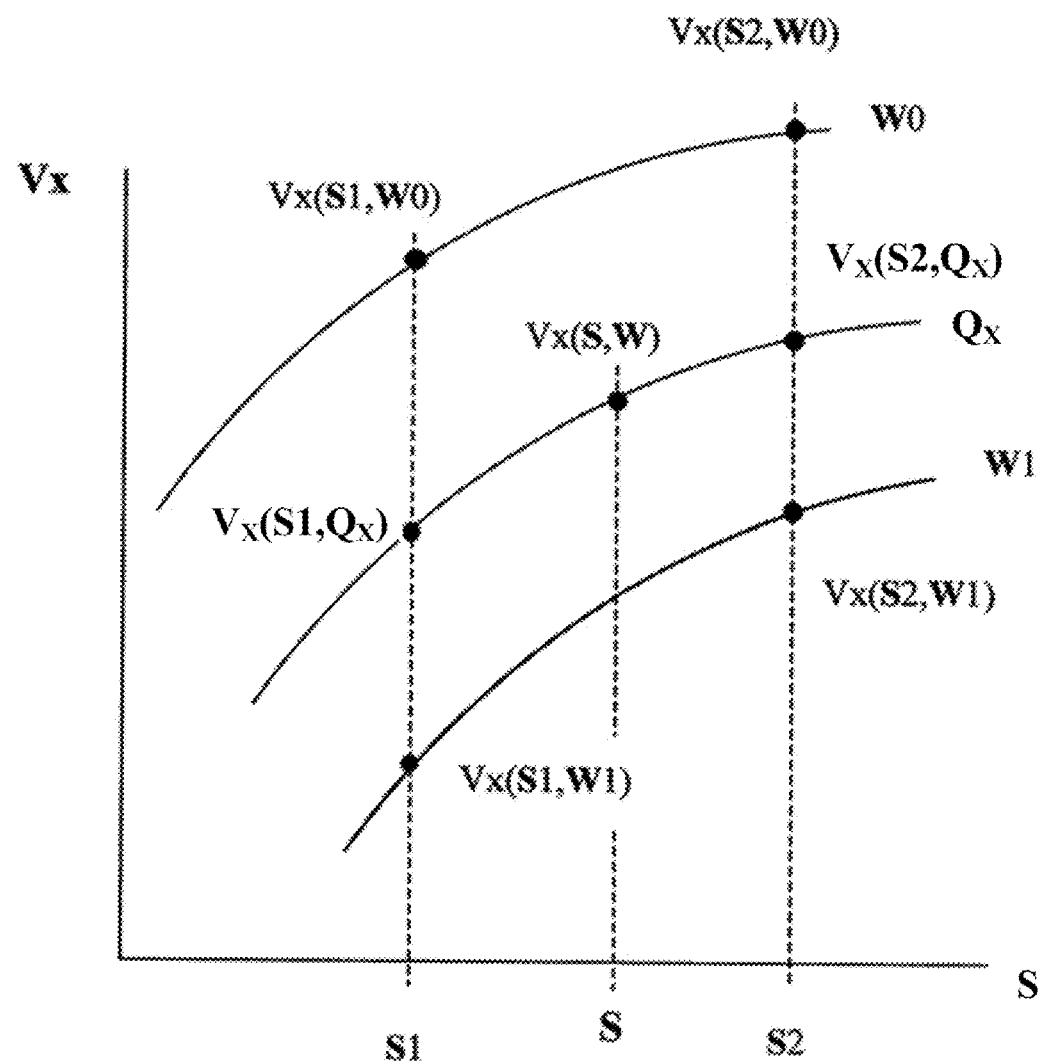
FIG. 7 provides a graph useful for understanding an embodiment of linear interpolation, in accordance with aspects of the present invention.

FIG. 7 provides a graph useful for understanding an embodiment of linear interpolation indicated by the method 600 of FIG. 6, in accordance with aspects of the present invention. The linear interpolation algorithm is performed by the anemometric processor 250 in the X plane to find $V_X(S,W)$ and in the Y plane to find $V_Y(S,W)$, where S is the wind speed of a received airflow and W is a wind direction of the airflow. In the X plane, the calibration points from the array generally take the form of $V_X(S_X,Q_X)$ and, in the Y plane, the calibration points from the array generally take the form of $V_Y(S_Y,Q_Y)$. For $V_X$, when $Q_X$ is about equal to $Q_Y$, and $S_X$ and $S_Y$ are about equal, the interpolation is complete and W is about equal $Q_X$ and $Q_Y$ and S is about equal to $S_X$ and $S_Y$.

In FIG. 7 linear interpolation is explained with respect to the X plane. A similar linear interpolation would also be performed in the Y plane. In each plane, four points of calibration array data are used at a time to iteratively converge on a wind direction ($Q_X$ or $Q_Y$), for a voltage ($V_X$ or $V_Y$) and a speed (S). The voltages $V_X$ and $V_Y$ will typically be in the range of 0-10 volts, in this embodiment. When the linear interpolation is complete, S and Q should be substantially the same in each plane, where $W \approx Q$.

The graph in FIG. 7 is a plot of $V_X$ versus speed for the X plane calibration array data. The data is a representation of a well-known general relationship between V, S, and W (or Q), which is represented in Equations (7) and (8) below. As an example, within a given quadrant, an initial guess could be that W=45 degrees and S=25 m/s. The four points are chosen from the calibration array data accordingly, which are $V_X(S1, W1)$, $V_X(S1, W0)$, $V_X(S2, W1)$, and $V_X(S2, W0)$.

Speeds S1 and S2 are chosen for the quadrant indicated by the $sign_X$ and $sign_X$, with the goal that $S1 < S < S2$. And two curves, one having angle W0 and the other having angle W1, are also chosen, with the goal that W (which is calculated as $Q_X$ in the X plane) lies between W0 and W1. In FIG. 7, the curve corresponding to the wind angle $Q_X$ lies between the curve having a wind angle of W0 and the curve having a wind angle of W1. The result of the interpolation is the point $V_X(S,W)$, which lies on the curve for angle $Q_X$.

In accordance with the present embodiment, to calculate $V_X(S,W)$, calculate $V_X(S2,Q_X)$ from $\Delta V_X(S2,Q_X)$; $V_X(S1,Q_X)$ from $\Delta V_X(S1,Q_X)$; and $V_X(S,W)$ from $\Delta V_X(S,W)$.

Calculating $V_X(S2,Q_X)$ includes the following calculations:

$$\Delta V_X(S2, Q_X) = \frac{V_X(S2, W1) - V_X(S2, W0)}{(W1 - W0)} \times (Q_X - W0), \text{ and} \quad (1)$$

$$V_X(S2, Q_X) = V_X(S2, W0) + \Delta V_X(S2, Q_X) \quad (2)$$

Similarly, calculating $V_X(S1,Q_X)$ includes the following calculations:

$$\Delta V_X(S1, Q_X) = \frac{V_X(S1, W1) - V_X(S1, W0)}{(W1 - W0)} \times (Q_X - W0); \text{ and} \quad (3)$$

$$V_X(S1, Q_X) = V_X(S1, W0) + \Delta V_X(S1, Q_X) \quad (4)$$

Then $V_X(S,Q_X)$ is calculated as follows:

$$\Delta V_X(S, W) = \frac{V_X(S2, Q_X) - V_X(S1, Q_X)}{(S2 - S1)} \times (S - S1); \text{ and} \quad (5)$$

$$V_X(S, W) = V_X(S1, Q_X) + \Delta V_X(S, W) \quad (6)$$

The linear interpolation process provides the relationships for the two planes having two functions with two independent variables, speed (S) and angle (W), or direction. By using four points in each of the X and Y planes, the resulting value for speed (S) and direction (W) in terms of these eight points can be calculated. Using the above Equations (1)-(6), the complete solution for each plane can be given as follows, where $Q_X$ and $Q_Y$, when about equal, can be more generally represented as W:

$$V_X(S, W) = \tag{7}$$
$$A0 + \frac{(S-S1)(A2-A0)}{(S2-S1)} + (W-W0)\left[A1 + \frac{(A3-A1)(S-S1)}{(S2-S1)}\right]$$

$$V_Y(S, W) = \tag{8}$$
$$B0 + \frac{(S-S1)(B2-B0)}{(S2-S1)} + (W-W0)\left[B1 + \frac{(B3-B1)(S-S1)}{(S2-S1)}\right]$$

Solving these equations for W in terms of $V_X$ and $V_Y$ provides a means for guessing different speeds and observing different resulting angles, i.e., to solve for W. Ultimately, through iteration performed by the anemometric processor 250, the final values of wind speed (S) and direction (W) are determined.

In Equation (8):

$$A0 = V_X(S1, W0) \tag{9}$$

$$A1 = \frac{V_X(S1, W0) - V_X(S1, W0)}{(W1 - W0)} \tag{10}$$

$$A2 = V_X(S2, W0) \tag{11}$$

$$A3 = \frac{V_X(S2, W1) - V_X(S2, W0)}{(W1 - W0)} \tag{12}$$

Similar relationships exist for B0-B3 in the Y plane. Therefore, through these relationships the anemometric processor 250 iteratively converges on wind speed (S) and direction (W) for the received airflow.

In accordance with aspects of the invention, a new approach to building and processing data related to a dual-axis, dual-element hot element anemometer is provided. Also in accordance with the invention, provided is a low cost fabrication process coupled with state of the art microcomputer technology and a unique processing approach that result in a precision low cost wind sensor.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A wind sensor comprising:
a first element and a second element arranged orthogonal to the first element; a storage media having a calibration data array comprising first calibration data associated with the first element and second calibration array data associated with second element; and
an anemometric processor configured to determine a wind speed (S) and direction (W) for an airflow received by the first and second elements using a first electrical parameter associated with the first element and the first calibration array data and a second electrical parameter associated with the second element and the second calibration array data.

2. The wind sensor of claim 1, wherein:
the first element defines an X-axis in an X plane and the first calibration data is X plane data; and
the second element defines a Y-axis in a Y plane and the second calibration data is Y plane data.

3. The wind sensor of claim 2, wherein the X plane data includes a plurality of first voltage calibration points $V_X(S_X, Q_X)$ in the X plane and the Y plane data includes a plurality of second voltage calibration points $V_Y(S_Y, Q_Y)$ in the Y plane, where $S_X$ is one in a set of wind speeds and $Q_X$ is one in a set of angles in the X plane, and $S_Y$ is one in a set of wind speeds and $Q_Y$ is one in a set of angles in the Y plane.

4. The wind sensor of claim 3, wherein:
the first electrical parameter associated with the first element is a voltage $V_X$; and
the second electrical parameter associated with the second element is a voltage $V_Y$.

5. The wind sensor of claim 4, wherein a sign associated with the airflow and the first element is a $sign_X$ and a sign associated with the airflow and the second element is a $sign_Y$, and the anemometric processor is configured to determine a quadrant of the airflow in an X-Y coordinate system from the $sign_X$ and the $sign_Y$ and to find wind speed (S) and direction (W) using X plane data and Y plane data in the quadrant.

6. The wind sensor of claim 5, wherein the anemometric processor is configured to determine the wind speed (S) and direction (W) for the airflow by performing linear interpolation to find $V_X(S, Q_X \approx W)$ in the X plane using the X plane data in the quadrant and to find $V_Y(S, Q_Y \approx W)$ in the Y plane using the Y plane data in the quadrant.

7. The wind sensor of claim 6, wherein $Q_X \approx W$ and $Q_Y \approx W$ when the anemometric processor determines a difference between $Q_X$ and $Q_Y$ to be within an error threshold.

8. The wind sensor of claim 6, wherein the anemometric processor iteratively performs the linear interpolation using four points in the X plane and four points in the Y plane for one or more of the iteratively performed linear interpolations.

9. A method of determining wind speed (S) and direction (W) for an airflow received by first and second elements of a cross-wire wind sensor, the method comprising:
providing a calibration data array in a storage media accessible by an anemometric processor, the calibration data array comprising first calibration data associated with the first element and second calibration array data associated with second element; and
calculating the wind speed (S) and direction (W) for the airflow using a first electrical parameter associated with the first element and the first calibration array data and a second electrical parameter associated with the second element and the second calibration array data.

10. The method of claim 9, wherein:
the first element defines an X-axis in an X plane and the first calibration data is X plane data and the second element defines a Y-axis in a Y plane and the second calibration data is Y plane data; and
the X plane data includes a plurality of first voltage calibration points $V_X(S_X, Q_X)$ in the X plane and the Y plane data includes a plurality of second voltage calibration points $V_Y(S_Y, Q_Y)$ in the Y plane, where $S_X$ is one in a set of wind speeds and $Q_X$ is one in a set of angles in the X plane, and $S_Y$ is one in a set of wind speeds and $Q_Y$ is one in a set of angles in the Y plane.

11. The method of claim 10, wherein the first electrical parameter associated with the first element is a voltage $V_X$ and the second electrical parameter associated with the second element is a voltage $V_Y$, the method further comprising:
from a direction of the airflow, determining a $sign_X$ associated with first element and a $sign_Y$ associated with the second element; and determining a quadrant of the airflow in an X-Y coordinate system from the $\text{sign}_X$ and the $\text{sign}_Y$ and finding the wind speed (S) and direction (W) using X plane data and Y plane data in the quadrant.

12. The method of claim 11, further comprising:
determining the wind speed (S) and direction (W) for the airflow by performing linear interpolation to find $V_X(S, Q_X \approx W)$ in the X plane using the X plane data in the quadrant and to find $V_Y(S, Q_Y \approx W)$ in the Y plane using the Y plane data in the quadrant.

13. The method of claim 12, wherein $Q_X \approx W$ and $Q_Y \approx W$ when the anemometric processor determines a difference between $Q_X$ and $Q_Y$ to be within an error threshold.

14. The method of claim 12, further comprising:
iteratively performing the linear interpolation using four points in the X plane and four points in the Y plane for one or more of the iteratively performed linear interpolations.

15. A method of generating a calibration array for a cross-wire wind sensor, the method comprising:
providing a storage media coupled to an anemometric processor and a probe having first and second elements in a crossed arrangement;
directing at the probe an airflow having a known speed (S) and angle (W);
recording a voltage difference across the first element as $V_X$ and a voltage difference across the second element as $V_Y$;
recording an airflow direction associated with the first element as $\text{sign}_X$ and an airflow direction associated with the second element as $\text{sign}_Y$;
storing $V_X$, $V_Y$, $\text{sign}_X$, and $\text{sign}_Y$ in association with the known speed (S) and angle (W); and
changing at least one of the known speed (S) and angle (W) and repeating the above steps.

16. A wind sensing probe including a pair of wind sensing elements, each wind sensing element comprising:
a core comprising a low specific heat and low density plastic polymer;
a pair of two metal leads extending from different ends of the core; and
a Nickel coil wound around the core, with at least about 100 windings per inch, wherein the pair of wind sensing elements includes first and second wind sensing elements coupled to:
a storage media having a calibration data array comprising first calibration data associated with a first wind sensing element and second calibration array data associated with a second wind sensing element.

17. The wind sensing probe of claim 16, further comprising a protective non-corrosive coating covering the coil.

18. The wind sensing probe of claim 16, wherein the leads are coupled to the core with a high temperature epoxy and the coil is coupled to the leads with a solder.

19. The wind sensing probe of claim 18, further comprising a protective non-corrosive coating covering the coil, the high temperature epoxy, and the solder.

20. The wind sensing probe of claim 16, wherein each element further comprises:
a second core comprising a low specific heat and low density plastic polymer;
a second pair of two metal leads extending from different ends of the second core; and
a second Nickel coil wound around the second core, with at least about 100 windings per inch, wherein the two wound Nickel coils are connected in series with one coil arranged to be parallel to each other.

\* \* \* \* \*